Dec. 8, 1931.   C. E. OLSON   1,835,894
LIGHT AND SIGNAL SWITCH
Filed Feb. 13, 1928
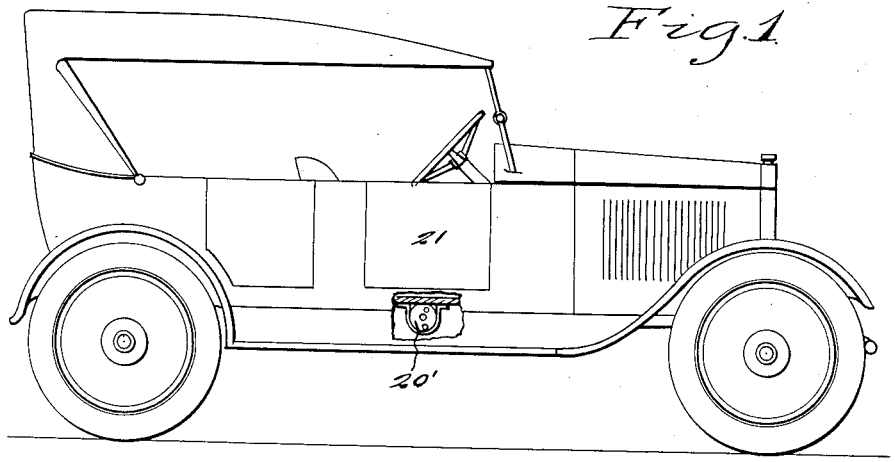
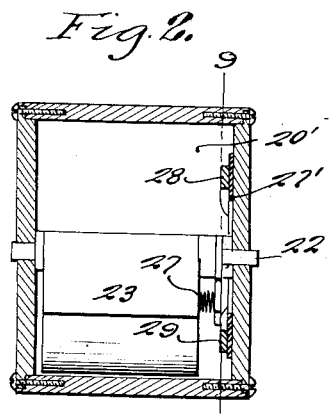
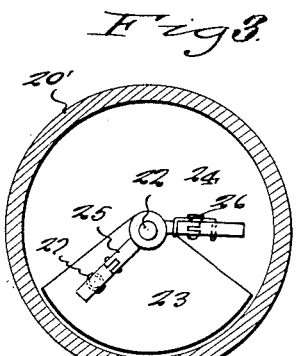
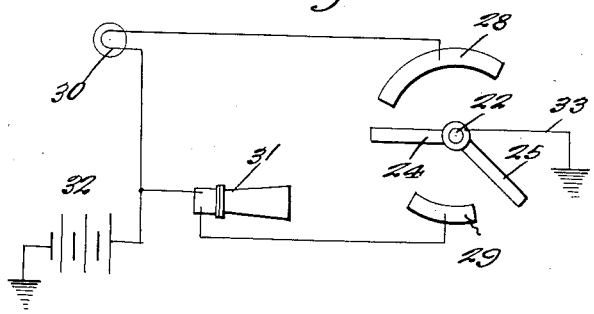
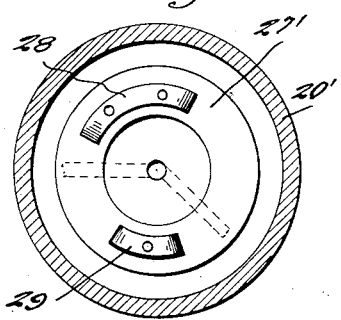
C. E. Olson
INVENTOR
BY *Victor J. Evans*
ATTORNEY
WITNESS:

Patented Dec. 8, 1931

1,835,894

UNITED STATES PATENT OFFICE

CHARLES E. OLSON, OF BRIDGEPORT, CONNECTICUT

LIGHT AND SIGNAL SWITCH

Application filed February 13, 1928. Serial No. 254,051.

My present invention has reference to an automatically operated danger signal for automobiles, my primary object being the provision of simple, but thoroughly effective means for illuminating a lamp such as the tail lamp of an automobile when the brakes of the machine are first applied, and to likewise cause the illumination of such lamp and the sounding of the horn of the machine when the brakes are quickly or violently applied.

A further object is to provide a danger signal for automobiles or like vehicles that shall include a circuit maker having contacts wired to the tail lamp and to the horn for the machine, and which circuit maker is actuated to complete a circuit first to the lamp, and thereafter to the horn by impulse or momentum delivered to said circuit maker by the jar imparted thereto upon the application of the brakes in the ordinary manner and upon the violent application of the brakes when the machine is to be brought to a sudden stop.

The invention will be fully and comprehensively understood from a consideration of the following detailed description when read in connection with the accompanying drawings which form part of the application, with the understanding, however, that the improvement is capable of extended application and is not confined to the exact showing of the drawings nor to the precise construction described and, therefore, such changes and modifications may be made therefrom as do not affect the spirit of the invention, nor exceed the scope thereof as expressed in the appended claim.

In the drawings:

Figure 1 is a side elevation of an automobile equipped with the improvement, parts of the machine being broken away.

Figure 2 is a longitudinal sectional view through the casing of the improvement disclosed by Figure 1.

Figure 3 is a sectional view on the line 9—9 of Figure 2.

Figure 4 is a sectional view through the casing looking directly toward the fixed contacts thereon.

Figure 5 is a diagrammatic view of the electric wiring.

In referring to the drawings in detail, 20' indicates a cylindrical casing which is strapped or otherwise secured transversely beneath the floor of the automobile 21. The casing 20' is provided with removable heads, each having an alining central round opening for the reception of the ends of a shaft 22 that carries a weight 23. The weight in this instance, is in the nature of a segment. The shaft, adjacent to one of its ends, carries spaced switch fingers 24 and 25, respectively. Each of the switch fingers 24 and 25, comprises two hingedly connected sections, one section, of course, being fixed to the shaft and the outer sections are influenced by springs 26 and 27, respectively. The spring 26 may be in the nature of a coil member and have its ends connected to the respective sections of the switch 24. Of course, the spring 27 is secured to one end of the weight 23. By this construction it will be seen that the switch members 24 and 25 are flexible and the springs 26 and 27 hold the outer sections of the switch members at a slight inclination with respect to the inner sections. Of course, suitable means limits the swinging of the outer elements of the switch members.

The head of the casing 20' disposed opposite the switch fingers 24 and 25 has secured thereon a disc of insulating material 27' and this disc carries arched contact plates 28 and 29, respectively. By reference to Figures 3 and 4 of the drawings it will be seen that the switch members 24 and 25 are arranged angularly with respect to each other, and that the weight 23 normally holds these fingers out of engagement with the contacts 28 and 29. Also by reference to Figure 2 it will be seen that the finger 24 is disposed nearer the contact 28 than is the finger 25 with respect to the contact 29. The contact 28 is wired to the tail lamp 30 of the automobile, and the shorter contact 29 is wired to the horn 31 of the said machine. Both of these wires are connected to a suitable battery 32 and a ground wire 33 leads from the shaft to a metal portion of the automobile. In this instance, the weight 23 imparts a rotary motion to the shaft 22, so that the switch finger 24 will first be brought into engagement with the contact 28, upon the gentle stopping of the automobile and thereby complete the circuit to the tail lamp 30. When the machine is brought to a quick stop by the violent application of the brakes the weight 20 will be swung to further turn the shaft which brings the switch finger 25 over the contact 29, so that the horn 31 will be automatically sounded while the tail lamp is still illuminated. When the machine is entirely stopped the weight will return the switch fingers to their initial position, thereby breaking the circuits.

Having described the invention, I claim:

A switch comprising a casing, a shaft centrally journaled through said casing, a segmental weight fixed on said shaft, angularly arranged switch members fixed on the shaft at one end of the weight and each comprising a pair of pivotally connected sections, resilient means for normally holding the sections in longitudinal alinement, and segmental plates providing contacts fixed on one end of the casing, insulated therefrom, engageable with the switch members.

In testimony whereof I affix my signature.

CHARLES E. OLSON.